United States Patent [19]
Tanaka et al.

[11] Patent Number: 5,001,576
[45] Date of Patent: Mar. 19, 1991

[54] IMAGE PROCESSOR WITH IMPROVED DISCRIMINATION BETWEEN CHARACTER IMAGE AND TONAL IMAGE

[75] Inventors: Kazuyoshi Tanaka; Masahiko Matsunawa; Hiroshi Katoh, all of Hachioji, Japan

[73] Assignee: Konica Corporation, Tokyo, Japan

[21] Appl. No.: 411,844

[22] Filed: Sep. 25, 1989

[30] Foreign Application Priority Data

Sep. 28, 1988 [JP] Japan .................. 63-243324
Sep. 28, 1988 [JP] Japan .................. 63-243325
Sep. 29, 1988 [JP] Japan .................. 63-245157

[51] Int. Cl.⁵ ............................................. H04N 1/40
[52] U.S. Cl. ................................. 358/462; 358/447
[58] Field of Search ............. 358/462, 443, 448, 450, 358/452, 453, 456, 464, 447; 382/9

[56] References Cited

U.S. PATENT DOCUMENTS

4,194,221 3/1980 Stoffal .................. 358/456
4,447,830 5/1984 Stoffel .................. 358/486 X
4,649,422 3/1987 Rauskolbe et al. ............. 358/447 X
4,668,995 5/1987 Chen et al. ................. 358/462 X
4,707,745 11/1987 Sakano .

FOREIGN PATENT DOCUMENTS

61-80964 4/1986 Japan .

OTHER PUBLICATIONS

Japan Electronic Communication Society, vol. J67 B No. 7 (1984) on pages 781 through 788, under the title of "Bilevel Rendition Method for Doc. Incl. Gray-Scale & Bilevel Image" (Nobuji Tetsutani and Hiroshi Ochi).

Primary Examiner—Victor R. Kostak
Attorney, Agent, or Firm—Frishauf, Holtz, Goodman & Woodward

[57] ABSTRACT

An image processor in which a high-frequency component of image signals is diminished, and a density value of each of the "diminished" image signals is compared with a first reference value in a first comparator. A first classifier is provided for classifying the image signals into a character image and a tonal image based on a signal output from the first comparator. A length or an area of an image signal classified into the tonal image is measured, and a second comparator is provided for comparing the length or area of a measured image signal measured with a second reference value corresponding to a reference length or a reference area. A second classifier is provided for further classifying an image signal below the second reference value from the second comparator into an image signal of the character image.

17 Claims, 12 Drawing Sheets

30: IMAGE PROCESSING DEVICE

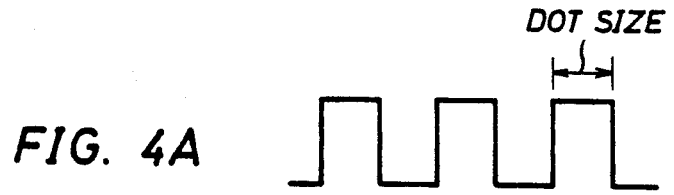
FIG. 4A
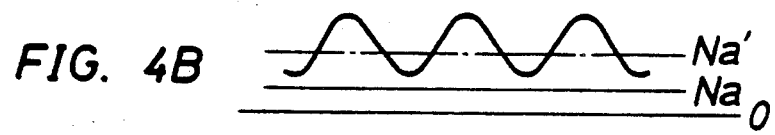
FIG. 4B
FIG. 5
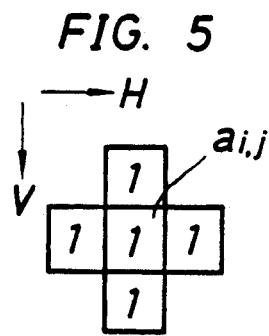
3×3 CONVOLUTION FILTER
FIG. 6
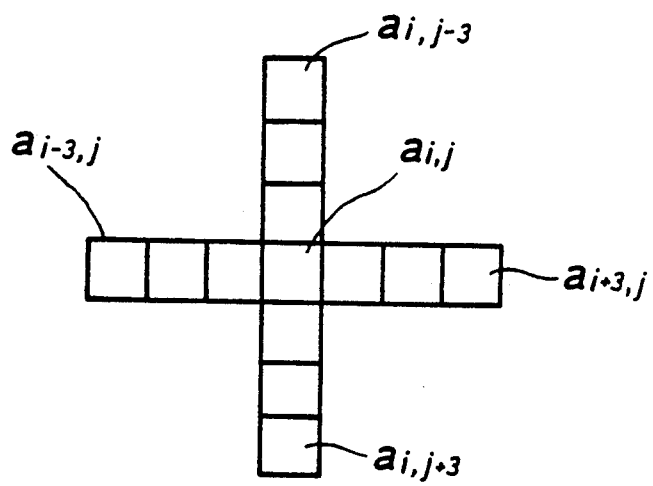
WINDOW FOR CHECKING 7×7

NORMAL CROSS FILTER

DIAGONAL CROSS FILTER

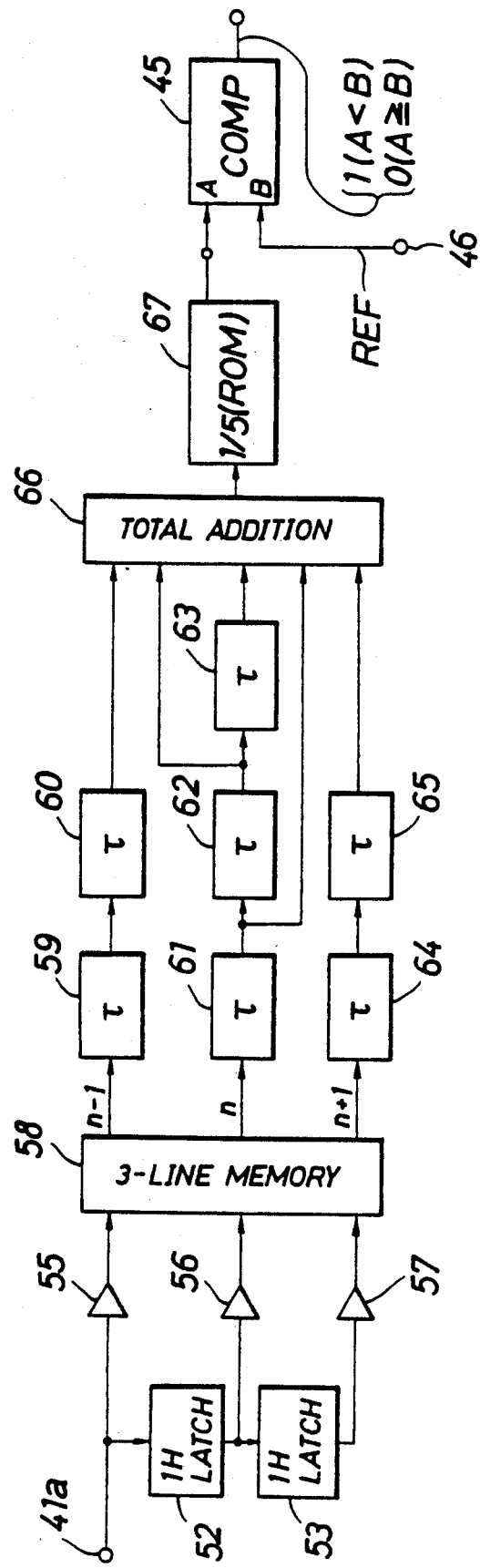

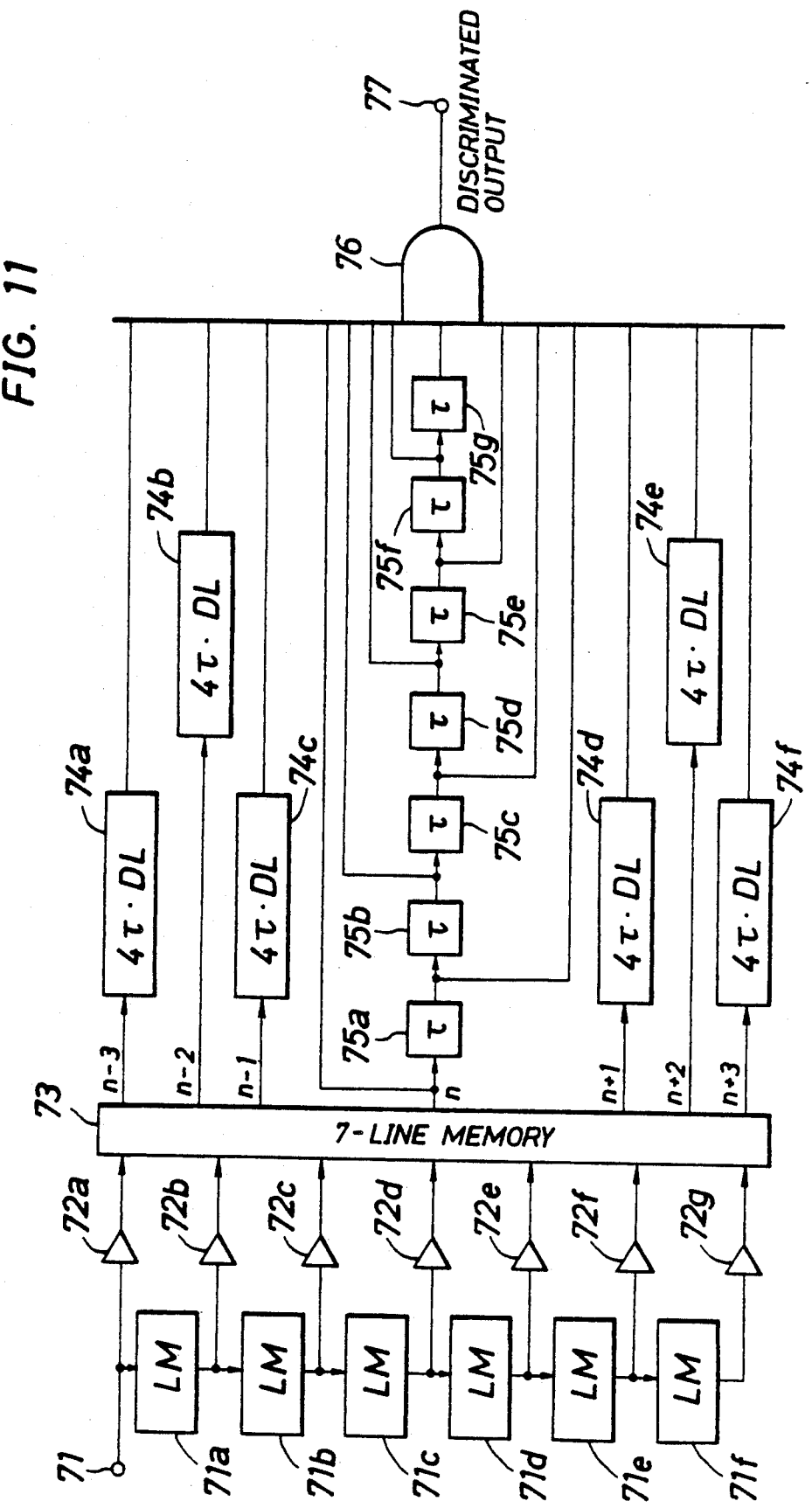

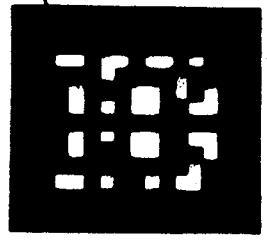
FIG. 12A ORIGINAL IMAGE
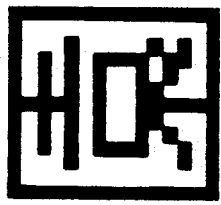
FIG. 12B FILTERING RESULT
INTERNAL OUT-OF-FORCUS PART, MISDISCRIMINATED AS GRADATION IMAGE
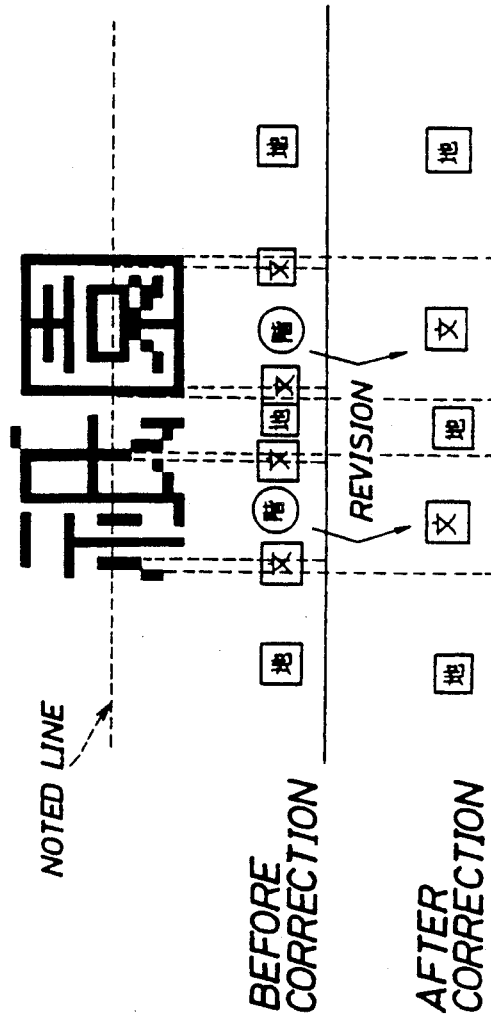
FIG. 13

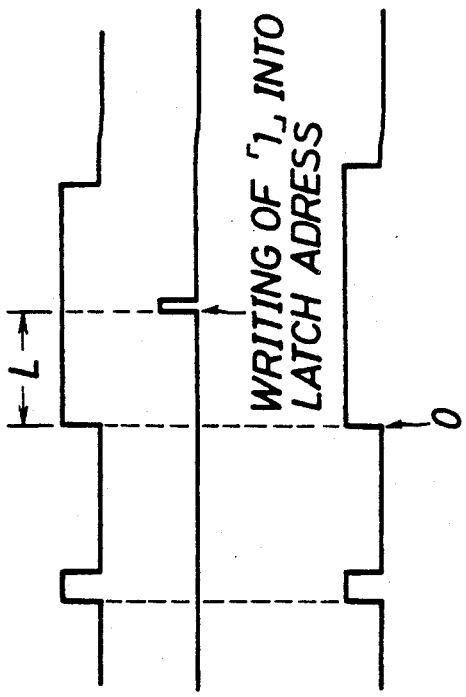
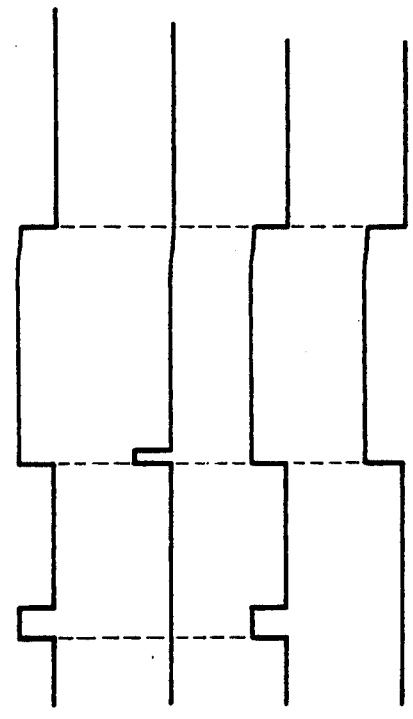
FIG. 15A  INPUT DATA (DISCRIMINATED OUTPUT)
FIG. 15B  PULSE P
FIG. 15C  LINE MEMORY 161
FIG. 16A  INPUT DATA PRECEDING BY 1 LINE (DISCRIMINATED OUTPUT)
FIG. 16B  LINE MEMORY 160
FIG. 16C  LINE MEMORY 161
FIG. 16D  SECOND DISCRIMINATED OUTPUT

170: PRE-PROCESSING CIRCUIT 5,001,576

IMAGE PROCESSOR WITH IMPROVED DISCRIMINATION BETWEEN CHARACTER IMAGE AND TONAL IMAGE

FIELD OF THE INVENTION

The present invention relates to an image processor suited for application to a digital electrophotographic copying apparatus, and more particularly, to an image processor which correctly discerns character images such as like characters and lines from a tonal image such as a photograph and dot-line image, for example.

DESCRIPTION OF THE PRIOR ART

Generally, any conventional digital electrophotographic copying apparatus divides the original image of the document into extremely fine picture elements each being about several-ten microns in size, and then converts an electrical signal (image signal) corresponding to the depth of each picture element into digital image signal. The image processor processes the digital image signal and then executes a digital-analog conversion. The analog-converted image signal is then transmitted to a recorder such as a laser printer before eventually reproducing a copied image via an electronic photographic process.

When operating any conventional digital electrophotographic copying apparatus, the content of the processed image is often variable according to the kind of input image data. For example, if the input image data were composed of sentences of a conventional book or letter, the depth of the character and the level of depth generated by the difference of color of the background texture(original color of the document paper) are less important, but instead, constant reproduction of clear and sharp characters is desired.

Accordingly, when operating such a conventional printer which merely outputs binary-coded ON and OFF signals an image is reproduced by converting the input image data into binary-coded data after completing comparison of all the input image data at a stationary depth level. On the other hand, when operating such a printer capable of recording multi-digital-value input images corresponding to image depth, the character image is sharply reproduced by critically controlling the black and white output during the reproduction process.

On the other hand, when receiving tonal input image data like a photographic image, reproduction of interim or intermediate tone is a critical problem, and thus, the object of the tonal image processing operation differs from the case of processing character images.

For example, when operating a binary-coded printer, a false interim tone image is initially formed by applying any conventional means like the DIZA process or the depth matrix method, and then an image is reproduced by applying the output image signal. Even when operating a multi-digital-value-applied printer, in many cases, the output characteristic is critically considered from the standpoint of satisfactory reproducibility of interim tones.

In particular, a special treatment is needed for the dot-line image often used for newspapers. Dot-line images are composed of a large number of fine dots. When microscopically looking at the dot image, there is no portion having an interim tone, but instead, the dot image is quite similar to a character image.

Nevertheless, since the proper object of the dot image is to reproduce false interim-tone images by applying dots having different sizes, and yet, such an image reproduced as tonal image such as a like photograph is easily visible. Furthermore, some of the dot images containing a certain number of dots are very close to the sampling pitch presently being applied to the image-reading and image-writing devices of those digital photographic copying apparatuses widely being used today. For example, if the sampling pitch were 400 dots per inch (or 16 dots per milimeter) and the number of dots per line is 133 lines per inch, then, the number of dots per line is fairly close to the sampling pitch.

If under the above condition is actually present, a distortion or a beat will result due to a difference between a sampling period and a period (pitch) of dots of an original images This distortion appears in the form of a "moire" stripe. This in turn significantly degrades the image quality. In particular, a "moire" stripe appears less frequently when reproducing image by applying false interim tones via the DIZA process. However, the DIZA process cannot sufficiently eliminate "moire" stripes.

To solve this problem, there is an idea for minimizing the interference of high-frequency component against the sampling pitch by descreasing high-frequency components from the original image. Concretely, such high-frequency component should be smoothened merely by applying peripheral picture elements.

As mentioned above, high quality of the output image can be maintained by switching the coefficient needed for the image processing and the process for encoding the digital image signal into a multi-digital-value image signal according to the kind of image. Normally, switching of the coefficient is performed by the operator himself by switching the processing modes according to the kind of original document.

Nevertheless, when copying such a document containing a variety of image data including characters an photographs on a pamphlet for example, if the character-image processing mode were set, then the reproducibility of the photographic portion will be lost. In other words, the operator cannot reproduce a copy satisfying both. Concretely, from the total viewpoint, the quality of copied content remains unsatisfactory.

This problem can be solved by discerning first whether the input image data is character image data or tonal image data at first, followed by switching the processing mode based on the result of discrimination.

Conventionally, there are a variety of means for discerning character image data from tonal image data. For example, one of these means divides the original image into a plurality of small blocks, and then, based on the discerned result per block unit, the processing mode is switched. The blockwise discrimination is introduced in the publication of Japan Electronic Communication Society, Vol. J67 B No. 7 (1984) on pages 781 through 788, under the title of "Method of Processing a Document Containing Binary-coded Image and Deep/pale Images into Binary-coded Digital Values". Another means for discerning character image from tonal image per image unit is described in the U.S. Pat. No. 4,707,745 for example.

Of those blockwise discrimination means, there is a method of checking the dispersion of the depth in the objective block. If the depth noticeably disperses, the system identifies that the objective block consists of a character images Nevertheless, this discrimination means often commits incorrect discrimination. If it occurs, the whole blocks will be subjected to incorrect processing to result in a significantly degraded image quality.

On the other hand, generally, the blockwise discrimination system needs a greater number of memories for provisionally storing image data than that is needed for the imagewise discrimination system. This in turn results in high cost and complicates the signal processing system.

On the other hand, even if the dispersion of the depth were incorrectly identified, the imagewise discrimination system is not subjected to adverse influence degrading the image reproducibility, and yet, the system dispenser with a large number of memories for provisionally storing image data. Nevertheless, this imagewise discrimination system still occasionally commits an error when discerning character image from tonal images. That is, it incorrectly discerns the content of character image to be tonal image under the conventional image discriminating method.

SUMMARY OF THE INVENTION

The primary object of the invention is to provide a novel image processor which improves the quality of a recorded image, in particular, by preventing incorrect discrimination of character image from tonal image.

The second object of the invention is to provide a novel image processor with simplified circuit construction for processing image data, in particular, the invention provides means for precisely processing a dot-line image without degrading grading the image quality at all.

The third object of the invention is to provide a novel image processor which discerns a dot-line image from a manually-written character image, in particular, when it discerns intermingled images per picture element.

The fourth object of the invention is to provide a novel image processor which has achieved precise image processing capability by perfectly coinciding with the image content, in particular, without degrading tonal characteristics of a graphic image.

To achieve the primary object, the invention provides a novel image processor comprising the following: a plurality of multi-digital-value encoding means which processes digital image signals generated by scanning the original document into multiple-digital-value-coded signals including binary-coded signals; an image selection means which selects digital image signals output from the multi-digital-value encoding means by applying an image-discerning output signal; and an intermingled-image discerning means for receiving digital image signals comprising first and second image-discrimination means, wherein the first image-discriminating means generates a first signal for discriminating an image and classifies the digital image signals into a plurality of kinds per picture element, and wherein the second image-discriminating means receiving the first image-discriminating signal further checks the first image-discriminating signal and then generates a second image-discriminating signal for classifying digital image signals into a plurality of kinds per picture element.

BRIEF DESCRIPTION OF THE DRAWINGS

FIGS. 4A and 4B are waveforms showing characteristics of a low-pass filter featuring the image processor;

FIG. 5 shows a concrete example of the low-pass filter featuring the image processor;

FIG. 6 shows the function of the depth-level judging circuit featuring the image processor;

FIG. 10 is a schematic block diagram of a concrete embodiment of the low-pass filter;

FIG. 11 is a schematic block diagram of a concrete embodiment of the depth-level judging circuit;

FIGS. 12A and 12B show samples of the actual effect generated by the low-pass filter;

FIG. 13 shows the actual results of the image discrimination effected for the input image;

FIGS. 15A–15C and 16A–16D are respectively the waveforms designating operation of the second image-discriminating circuit shown in FIG. 14;

DESCRIPTION OF THE PREFERRED EMBODIMENTS

Referring now more particularly to the accompanying drawings, an embodiment of the image processor of the invention installed inside of the digital electrophotographic copying apparatus is described below.

Figure 1:
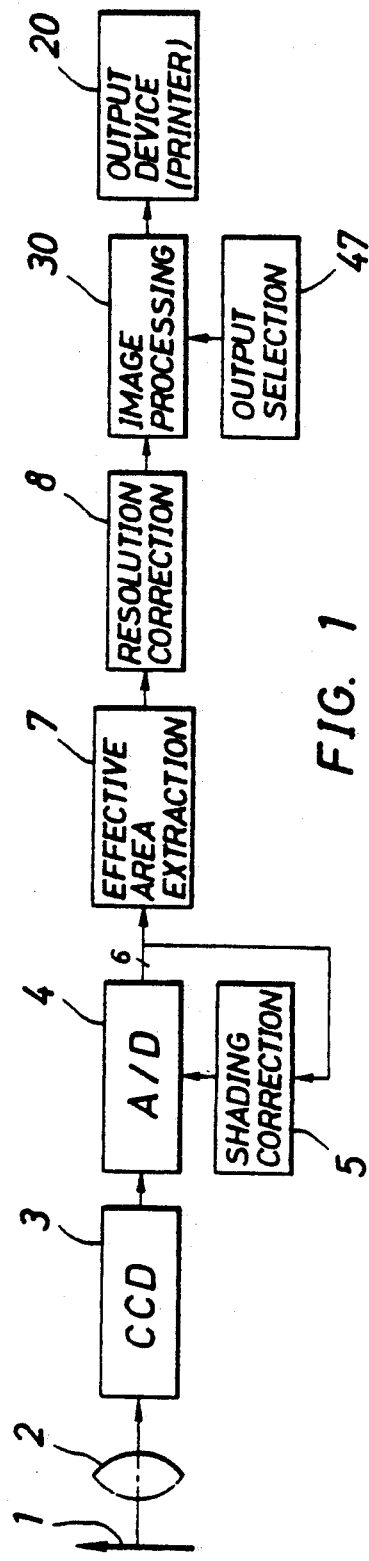
FIG. 1 is a simplified diagram of the essential components of a digital electrophotographic copying apparatus incorporating the image processor of the invention.

FIG. 1 is the simplified block diagram designating the essential components of the digital electrophotographic copying apparatus 10.

An optical image generated by optical scanning over the original document 1 is initially fed to image-reading means 3 comprised of a charge-coupled device (CCD) for example via lens 2 before eventually being converted into an electric signal. The electric signal is hereinafter called the image signal. Next, the image signal is transmitted to analog-digital (A/D) converter 4, where the image signal is converted into a digital image signal. The reference numeral 5 designates the shading correction circuit.

After being transmitted to the effective-area extraction circuit 7, only the needed region like the image signal corresponding to a B-4-size paper for example is extracted from the digital image signal. The digital image signal is then transmitted to the resolution-correcting circuit 8. In this embodiment, the resolution of an image is corrected by correcting MTF. After being corrected by MTF, the digital image signal with corrected resolution is then transmitted to the image processor 30 of the invention.

As described later on, a plurality of multi-digital-value-coding means are provided for the image processor 30 in order to encode the digital image signal into a multi-digital-value-coded signal. Any of these multi-digital value-coding means is selected by the image-discriminating signal output from the intermingled-image discriminating means which outputs an image-discriminating signal corresponding to character image or tonal images The reference numeral 47 designates the output selector. Details of these components are described later on. The multi-digital-value-coding means also encodes the digital image signal into binary code.

The multi-digital-value-coded image signal is then transmitted to the output unit 20 before the input signal is eventually reproduced. An electrophotographic printer using a laser beam is used in the output unit 20 for example.

Figure 2:
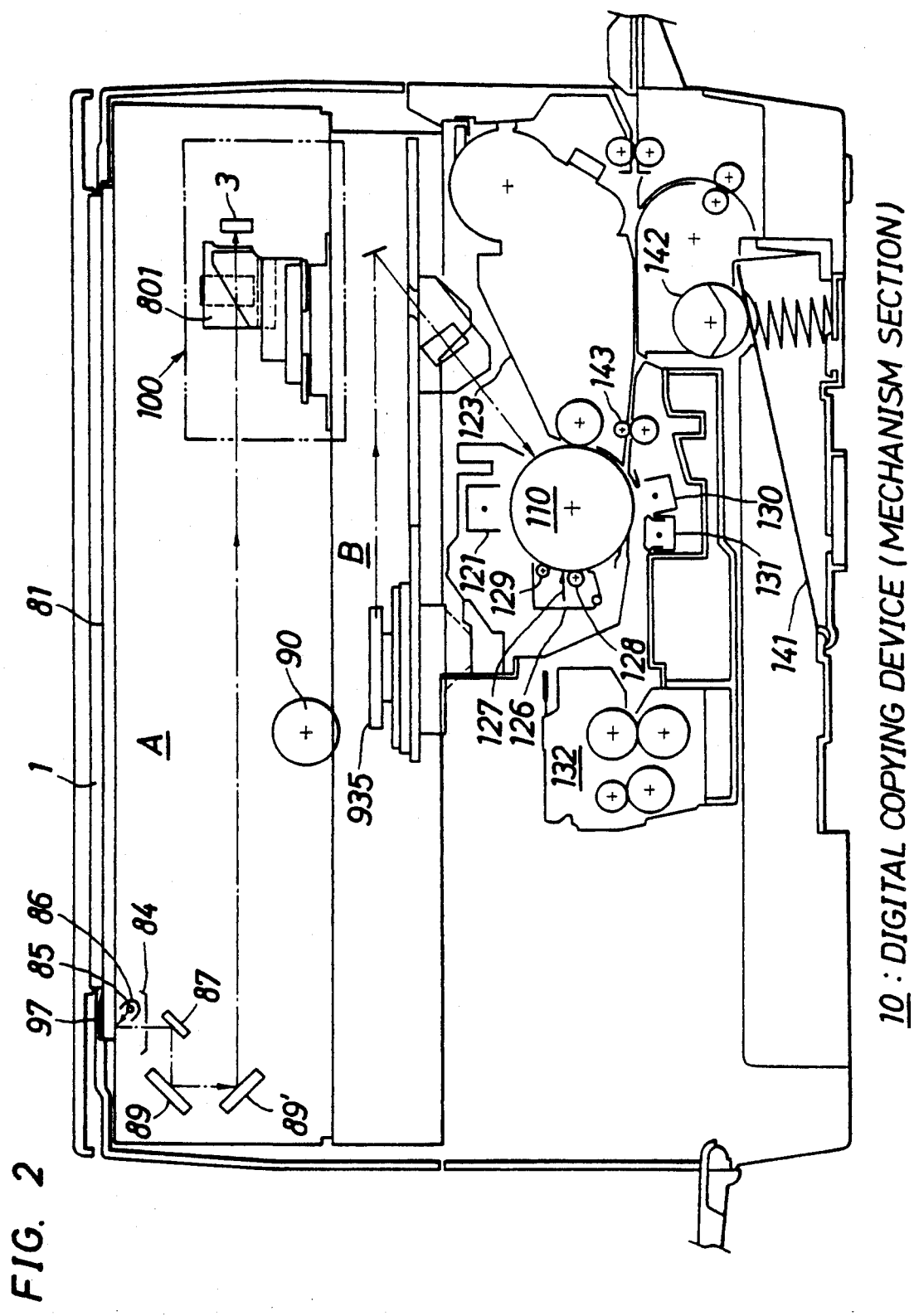
FIG. 2 is a structural block diagram of the essential components of the digital electrophotographic copying apparatus incorporating the image processor of the invention.

FIG. 2 is an example of the structure of the digital electrophotographic copying apparatus. When the operator turns the copy button of the apparatus ON, the document reader A is activated. Then, optical scanner optically scans the original document 1 on table 81.

The optical scanner is comprises the following: carriage 84 provided with light source 86 and reflection mirror 86m, mirror 87 which integrally moves with the carriage 84 and routes a light beam (from the light source 85) being reflected by the original document 1 to mirror 89 forming part of a V mirror, and the V-mirrors 89 and 89' moving themselves in the identical direction at a speed one-half speed of mirror 87, respectively. Stepping motor 90 drives the carriage 84 and the V mirrors 89 and 89' over a sliding rail (not shown). Either a halogen lamp or a commercially available white thermo-luminance fluorescent lamp may be used as the light source 85.

A standard white board 97 is set to the left of the upper surface of the platen glass 81. An optical scanner scans the standard white board 97 to normalize the image signal into the reference white signal.

Now, the optical image generated by the radiation of the light beam from the light source 85 against the original document 1 is then led to the optical-data conversion unit 100 via the reflecting mirror 87 and the V mirrors 89 and 89'. The optical-data conversion unit 100 comprises of lens 801 and CCD 3 which function as an image reading means.

The image signal photoelectrically converted by the CCD 3 is then transmitted to the signal processor in order that a variety of processes can be executed before the processed image signal is output to the data-writing unit B.

The data-writing unit B includes a deflection device 935. This deflection device 935 may comprise either a galvano mirror, or a rotary multi-surface mirror, or a photo-deflector using a quartz plate. A laser beam modulated by a digital image signal is deflectively scanned by the deflector 935.

The modulated laser beam performs the main scanning operation over the photoreceptive drum 110 (the image formation body) which is uniformly charged by charger 121. As a result of the main and subordinative scanning operations performed by the rotation of the photoreceptive drum 110, an electrostatic latent image corresponding to the image signal is generated on the photoreceptive drum 110. The electrostatic latent image is developed by the developing device 123 which stores black toner.

The copying paper delivered from the paper feeding device 141 via delivery roller 142 and the timing roller 143 is conveyed to the bottom of the photoreceptive drum 110 based on the timing compatible with the rotation of the photoreceptive drum 110. Then, black toner is transferred onto the copying paper by the transfer pole 130 bearing high-voltage current, and then the copied paper is separated from the photoreceptive drum 110 by the separation pole 131.

After being separated, the image-recorded paper is conveyed to the toner-fixation device 132, where the image-recorded paper receives a toner-fixing process before eventually being discharged from the copying apparatus.

After completing the toner transfer operation, the photoreceptive drum 110 is cleaned by the cleaning device 126 and then prepared for the ensuing image formation process.

The reference numeral 127 designates the cleaning blade, and 128 and 129 are respectively the metallic rollers receiving the predetermined DC voltage.

Now, the image processor 30 of the present invention executes the process for encoding the digital image signal into a multi-digital-value-coded signal corresponding to the input signal. The image processor of the invention employs the method of discerning image per picture element for encoding the digital image signal into a multi-digital-value-coded image signal.

Figure 3:
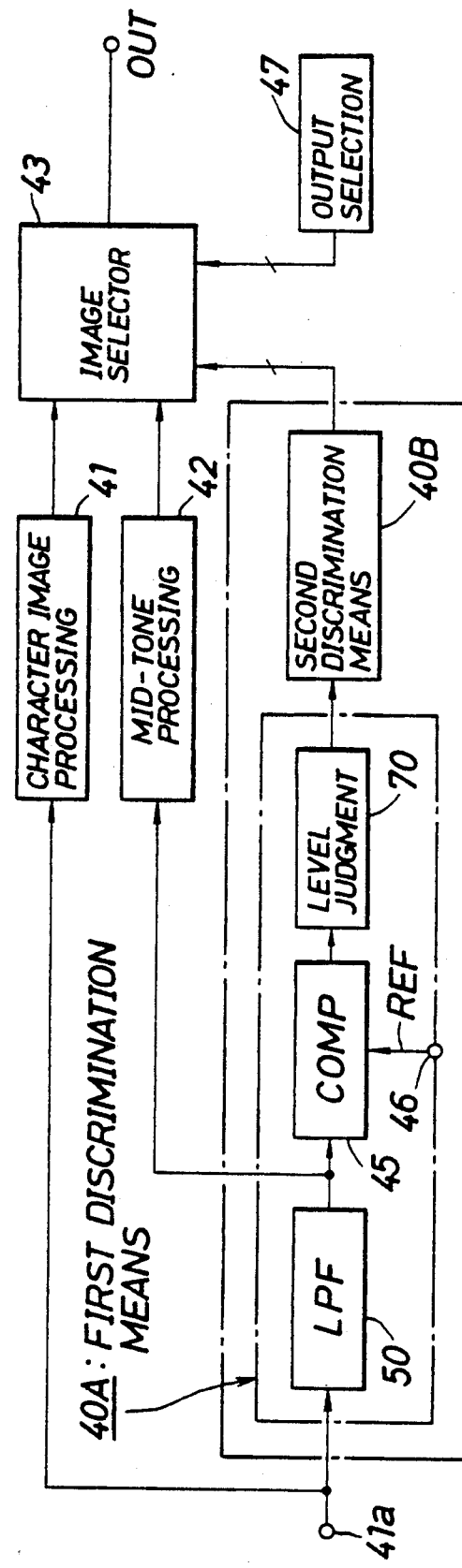
FIG. 3 is a schematic block diagram of an embodiment of an image processor related to the invention.

FIG. 3 is the schematic block diagram of an embodiment of the image processor of the invention.

A digital image signal complete with the correction of the resolution via MTF is initially transmitted to terminal 41a and is then routed to the character image processing circuit 41 functioning as a multi-digital-value-coding means. The character-image processing circuit 41 processes the image proper to character image in order that character can be reproduced distinctly. Since binary-coding is sufficient for character image, the digital image signal is converted into binary code by applying a stationary threshold value.

Furthermore, the digital image signal is routed to low-pass filter 50 comprising part of intermingled-image discriminating means 40, and then the digital image signal is transmitted to the interim-tone processing circuit 42 functioning as a multi-digital-value-coding means so that the digital image signal can be provided with the predetertonal characteristic. To generate false interim-tone image, a threshold value generated by the DIZA process is used for the threshold value needed for encoding the digital image signal into the multi-digital-value-coded signal. After the digital image signal is once filtered out of the low-pass filter 50, the image processor 30 feeds the digital image signal to the interim-tone processing circuit 42. This is because the system prevents occurrence of a "moire" stripe in the dot-line image by decreasing the high-frequency component of the digital image signal.

As mentioned above, since the low-pass filter 50 provided for intermingled image discriminating means 40 also functions as the low-pass filter of the interim-tone processing circuit 42, the system can commonly use the low-pass filter 50, thus resulting in a simplified circuit construction.

It may also be considered that the low-pass filter 50 of the interim-tone processing circuit 42 concurrently serves as the low-pass filter of intermingled image discriminating means 40. The low-pass filter may also be provided for the interim-tone processing circuit 42 independently instead of the commonly available one.

Next, the digital image signal is transmitted to intermingled image discriminating means 40. The image discriminating signal output from this means 40 is then delivered to the image selector 43 to control operation of this image selector 43. The signal output from intermingled image discriminating means 40 is substantially the output signal from the second image discriminating means and comprises 1-bit data. The second image discriminating output signal selects either the character image or the tonal image according to the image content.

Concretely, when an intermingled mode as hereinafter described is designated and a picture element is identified to be the character image, the image discriminating output signal turns into "0", and as a result, the signal output from the character image processing circuit 41 is selected. On the other hand, when the picture element is identified to be the tonal image, the image discriminating output signal turns into "1", and as a result, the signal output from the interim tone processing circuit 42 is selected. The reference numeral 47 designates the output selector provided for the operation panel of the digital electrophotographic copying apparatus.

There are three kinds of mode-select switches in the output selector 47 including character mode, tonal mode, and intermingled mode. If either the character mode or the tonal mode were selected, irrelevant to the result of the output from intermingled image discriminating means 40, delivery of the output signal to the printer 20 is permitted merely by means of the selected mode.

On the other hand, if the operator selects the intermingled image mode, either of the tonal-image processed data and the character image processed data is automatically selected by each picture element by the image discriminating signal output from intermingled image discriminating means 40, and then, the selected data is automatically output. As a result, even when character image and tonal image intermingle on the identical original document 1, if the operator selects the intermingled mode, image quality at the moment of output is securely maintained.

The above-cited intermingled image discriminating means 40 comprises of first and second image discriminating means 40A and 40B.

The first image discriminating system 40A roughly discriminates the input image between character image and tonal image before generating the first image discriminating signal to be output. On the other hand, the second image discriminating system 40B receives the first image discriminating signal over again and finely discriminates the image discriminating signal of the tonal image included in the first image discriminating signal corresponding to character image before eventually generating the second image discriminating output signal related to character image and tonal image. The first image-discriminating system 40A is described below.

The first image discriminating system 40A comprises a low-pass filter dealing with the target picture element, comparator 45 which compares the signal output from the low-pass filter 50 dealing with the target picture element to the reference value REF, and depth-level judging circuit 70 which judges the depth level of the signal related to the target picture element output from the comparator 45.

The low-pass filter 50 facilitates rough discrimination between character image and tonal image by decreasing the high-frequency component of the input image signal.

If the input image signal were substantially the photographic image or the dot-line image, depth of the target picture element disperses to each dot by decreasing the high-frequency component of the imput image signal, and as a result, all the picture elements will show a certain depth which is stronger than the predetermined depth Na.

As shown in FIG. 4-A, when dealing with dot-line image, the difference of the depth between the dot portions and the dot-absent portion clearly appears. After decreasing the high-frequency component by filtering the dot-line image through the low-pass filter 50, as shown in FIG. 4-B, those signals (very close to the sine wave signal) corresponding to the repeated pitch of the dot-line image are generated in superimposition with the DC level Na' above the predetermined level Na.

Now, therefore, comparator 45 discriminates the depth of the target picture element by applying the reference value REF having the predetermined depth level below Na delivered to terminal 46.

The reference value REF is substantially lower than the threshold value when normally encoding character image into a binary-coded signal, and thus, the reference value REF should be set to a certain value slightly higher than the background texture level. If the reference value REF were too low, then, actual depth cannot be discerned from the background texture level. Conversely, if the reference value REF were too high, when dispersing the dot-line image through the low-pass filter 50, the depth of the target picture element becomes weaker than the reference value REF, and as a result, the system may incorrectly discern the actual depth value.

Therefore, it is preferred to set up the reference value REF only after detecting the background texture level by combining the function of the comparator 45 with that of automatic depth adjustment means which determines the background texture level by preliminarily reading the content of the original document 1.

In the present embodiment, when dealing with a photographic image or a dot-line image, the comparator 45 outputs "1", whereas it outputs "0" when dealing with either a character image or a line image.

When the following step is entered, the depth-level judging circuit 70 again judges the comparison data output from the comparator 45.

To implement this, a checking window having a predetermined size is provided in the periphery of the target picture element. When all the picture elements present inside of the checking window are greater than the reference value REF, the target picture element is identified to be the tonal image.

Since the depth of the dot-line image is widely dispersed, the dot-line image is discerned to be the tonal image as a result of the above process.

On the other hand, even if the texture were dispersed, a certain value lower than the reference value REF still remains in the character image, and as a result, part of the checking window overhangs this portion. The depth-level judging circuit 70 then identifies the target picture element to be the character image.

FIG. 5 illustrates an embodiment of the low-pass filter 50 which uses a $3 \times 3$ convolutional filter having the cross structure.

The convolutional filter serving as low-pass filter 50 brings the target picture element $a_{i,j}$ and the peripheral picture elements back to the original target picture element by adding a certain weight $C_{i,j}$. In this embodiment, the target picture element is merely added to those picture elements surrounding the target picture element, and then the sum is divided by 5 to average the values. Accordingly, the value a' i, j of the target picture element output from the low-pass filter 50 is determined by the equation shown below.

$$a'i, j = (1/5) \times \Sigma(ci, j \times ai, j)$$

The embodiment of the invention has introduced the crossed low-pass filter 50 using the weight-1-type filter for the reason explained below.

The greater the size of the low-pass filter 50, the further the dispersion of result, and thus, even coarse dots can be dealt with. However, since the total depth level gradually lowers, the threshold value cannot easily be determined, thus easily generating incorrect discrimination. Furthermore, the greater the size of the low-pass filter, the greater the restriction on hardware.

Consequently, considering the restriction on hardware, the embodiment of the invention uses the 3×3 picture-element size.

Figure 7A:
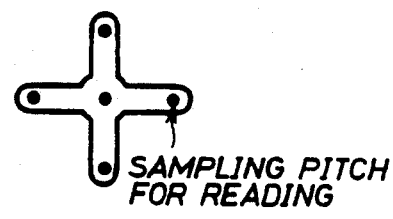
FIGS. 7A, 7B, 8A and 8B respectively shows characteristics of the low-pass filter.
Figure 7B:
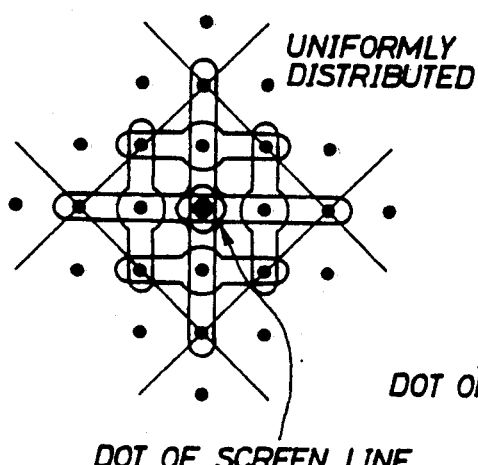

Referring now to FIG. 7, the reason for the introduction of the crossed low-pass filter is explained below. Assume that the center position corresponds to the dot-lines and the oblique lines respectively designate the dot-line pattern. The assembly of fine dots corresponds to the minimum reading unit. When dealing with dot-line image and particularly monochrome image, dot lines are often disposed in the 45°-direction. By applying the crossed filter shown in FIG. 7-A, the filtered result smoothly spreads along the dot-line structure in the diamond shape as shown in FIG. 7-B. As a result, even when the window overhangs any picture element, extremely weak depth is not present in all portions. This allows the system to correctly identify that there is the dot-line image as expected.

Figure 8A:
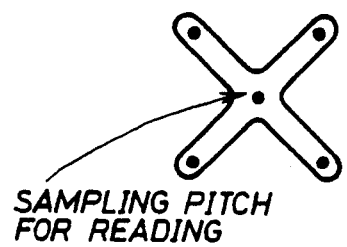
Figure 8B:
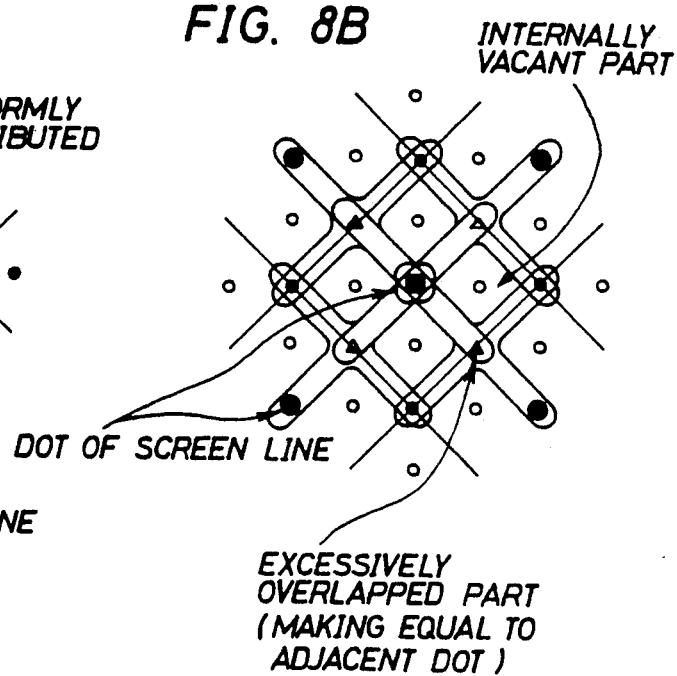

On the other hand, when using the filter shown in FIG. 8-A dispersing dots in the X-direction, and if the dot-lines were very fine, as shown in FIG. 8-B, strong depth is present in some portions as a result of averaging the dots of adjoining dot lines. On the other hand, since those portions surrounded by the X remain unaffected by the filter, the depth in these portions still remains weak.

As a result, when part of the checking window overhangs the portion surrounded by the X, the depth in these portions is weaker than the reference value REF, and thus, there is a possibility of causing the system to incorrectly discern that the target picture element is not tonal images. Accordingly, it is quite apparent that the cross shape is ideally suited for the filter.

In order to uniformly disperse dots, desirably, the coefficient of each filter should remain "1". In other words, the coefficient of each filter should be equal to each other.

It is expected that even a very coarse dot-line image can smoothly be dispersed by employing low-pass filter 50.

However, the effective range of the low-pass filter 50 cannot extend to the excessively coarse dot-line image and extremely fine dots having weak depth, and thus, there is a possibility to cause the system to incorrectly discern the dot-line image to be the character image.

Normally, such a dot inducing incorrect discrimination is always isolated and extremely fine. The performance potential of the system for correctly detecting the dot-line image can be improved by providing the isolated-dot detection circuit in the position next to the low-pass filter 50 as required.

For example, the isolated-dot detection circuit can introduce means for checking the picture elements in the periphery of the picture element identified to be black. If all the ambient picture elements were black, this circuit identifies that the checked picture element is actually the isolated dot before eventually processing the dot-line image.

In order to achieve the maximum effect by applying the minimum hardware, the embodiment of the invention uses the crossed 3×3 low-pass filter. It is also possible for the embodiment to introduce such a low-pass filter having a greater dimension provided that it has a resolution sufficient to disintegrate the difference between the depth dispersed by the filter and the depth of the background texture.

If such a low-pass filter having a greater size were introduced, it can more effectively smoothen the dot-line image than that is done by a 3×3 picture-element-size filter. Like the above case, in order to smoothen the dot-line image more uniformly, the system also introduces the crossed filter extending by the amount corresponding to n-number of picture elements (where n is an integer of more than 1) in the vertical and horizontal directions from the target picture element. The filter should desirably be the one capable of bringing the value averaged from the sum of 4n+picture elements back to the target picture element.

The depth-level judging circuit 70 is provided with the crossed 7×7 picture-element checking window shown in FIG. 6. This window deals with each three units of picture elements extending themselves in the vertical and horizontal directions. When all the depth values of 13 picture elements including the target picture element ai, j in the center are more (stronger) than the reference value REF, the target picture element is identified to be the tonal image.

Figure 9:
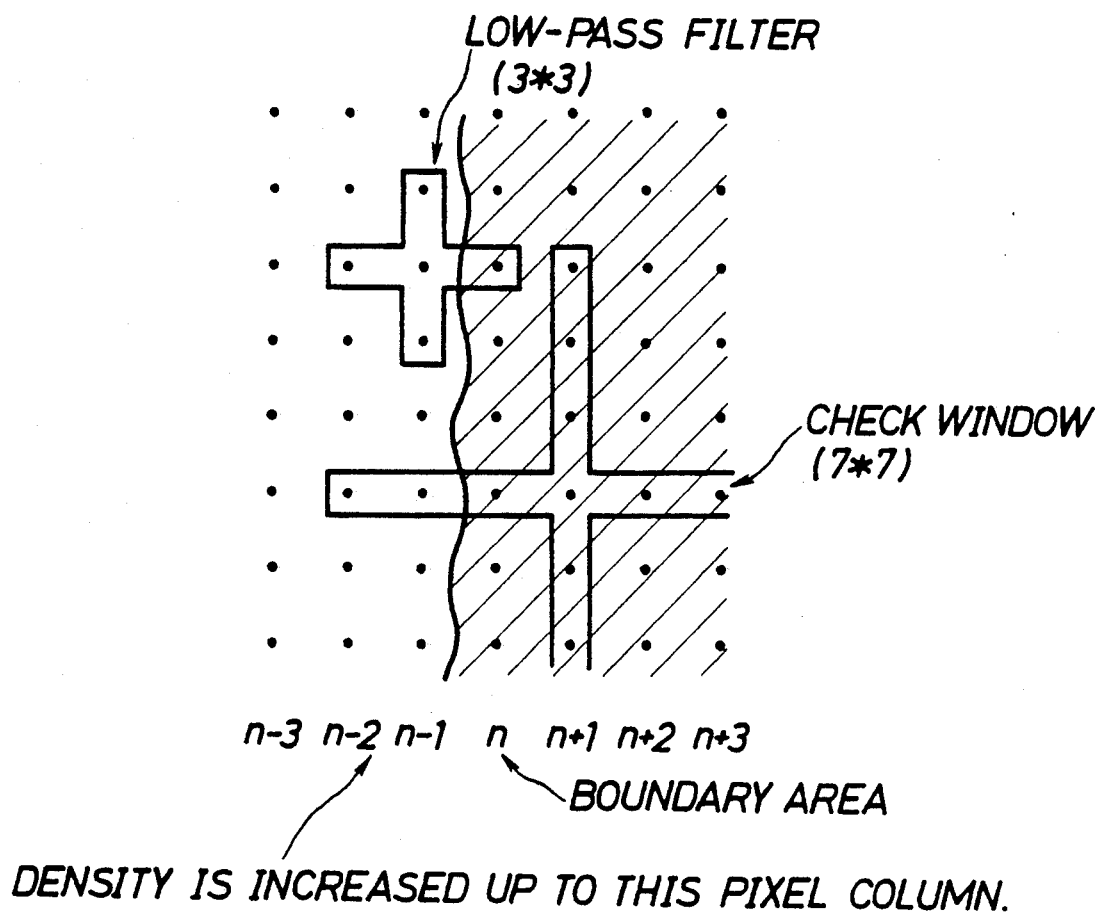
FIG. 9 shows a depth-level judging operation.

Referring now to FIG. 9, the reason for introducing the 7×7 picture-element checking window is explained below.

In many cases, normally, a character image or line image runs in parallel with the surface of the original document, in other words, in parallel with the direction of the main or subordinative scanning. While the scanning operation is underway, unless the contour of the border is distinctly processed as the character portion, the contour becomes blurred after completing the tonal-image processing operation for example.

As shown in FIG. 9, if the effective region starts from the n-th picture element, depth is dispersed by the low-pass filter 50 up to the n-th picture element. If the arm of the 7×7 picture-element checking window were present in any region up to the n-2 picture element, the depth in part of these regions becomes weaker than the reference value REF, and as a result, the target picture element is identified to be the character image.

In other words, those regions up to the n+1 picture element row are identified to be the character image. More particularly, those regions up to two picture elements inside of the border (contour) are securely identified to be the character image.

By virtue of the function of the checking window, a clear and distinct image can be reproduced without blurred contour along the border.

As is clear from FIG. 9, the size of the checking window used for the depth-level judging circuit 70 should be greater than the size of the checking window of the low-pass filter 50. Assume that the low-pass filter 50 has a length of n-picture elements in the vertical and horizontal directions. Then, the length of the checking window for identifying the depth level extends by the amount corresponding to m-picture elements in the vertical and horizontal directions by introducing integer m which is greater than n.

FIG. 10 is a concrete embodiment of the low-pass filter 50. A digital image signal transmitted to terminal 41a is initially led to the 1H latch circuits 52 and 53 which are connected to each other. H designates the period of a horizontal scanning operation. Next, the digital image signal and the 1H-and-2H-delayed digital image signals are simultaneously transmitted to line memory 58 via amplifiers 55 through 57.

Of those digital image signals output from the line emory 58 through three transmission lines, the digital image signal flowing through the line n−1 is delivered to he adder 66 via a pair of latch circuits 59 and 60 which respectively use a picture element for composing the delay time "r". In the same way, the digital image signal flowing through line n is also delivered to the adder 66 via latch circuits 61 through 63. The other digital image signal flowing through n+1 is also delivered to the adder 66 via a pair of latch circuits 64 and 65.

Using those latch circuits mentioned above, all the digital image signals of picture elements shown in FIG. 5 are simultaneously obtainable. All the added digital image signals are reduced to one-fifth by the following coefficient operator 67 incorporating a ROM.

FIG. 11 is a concrete embodiment of the depth-level judging circuit 70. Since the depth-level judging circuit 70 uses the checking window, basically, the structure of the depth-level judging circuit 70 is identical to that of the low-pass filter 50. However, since the data signal delivered to the depth-level judging circuit 70 is substantially the depth-level judging signal to be output from the low-pass filter 50, a 1-bit signal designating either character image or tonal image is used.

Nevertheless, since the depth-level judging circuit 70 uses the 7×7 picture-element checking window, the digital image signal should be delayed by a period corresponding to seven picture elements transmitted through seven lines. Because of this, the number of the 1H-delay and 1-picture-element-delay latch circuit corresponds to 7 lines transmitting seven picture elements.

The reference numerals 71a through 71f respectively designate the 1H-delay latch circuits, 72a through 72g designate amplifiers, and 73 the integral memory dealing with 7 lines of digital image signals. The reference numerals 74a through 74f respectively designate latch circuits which respectively delay the digital image signal by a period corresponding to four picture elements.

The latch circuits 74a through 74f respectively comprise the vertically connected four latch circuits. However, four-unit composition is merely designated by a unit of latch circuit in FIG. 4 for the convenience of illustration. The reference numerals 75a through 75g respectively designate latch circuits each dealing with one picture element.

By initially delaying seven digital image signals flowing through seven lines by operating a plurality of latch circuits by a period corresponding to the predetermined picture element and then allowing delayed signals to be output from the predetermined terminal positions, it is possible for the depth-level judging circuit 70 to simultaneously generate digital image signals of those picture elements compatible with the checking window shown in FIG. 6. Accordingly, the depth level of all the picture elements exceeds the reference value REF by logically multiplying the corresponding digital image signals by means of AND circuit 76. As a result, the output terminal 77 receives the image-discriminating output signal which turns the target image into "1" when the output signal is "1".

Consequently, the image processor of the invention can securely discern and process the input image of the original document with extreme precision and efficiency beyond any of the corresponding conventional arts. In particular, the image processor of the invention has made it possible to correctly discern the dot-line image to be the tonal image by introducing the checking window to the low-pass filter 50 and another window for identifying the depth level, thus overcoming the difficulty in the discrimination of a dot-line image inherent to any of the conventional arts.

Since the image processor of the invention processes the interim-tone image based on the signal from the low-pass filter 50, a very distinct image can be reproduced without the presence of a "moire" stripe. Furthermore, as a result of the comparison to the background texture data, the depth level judging circuit 70 can correctly identify low-contrast manually-written character data to be the character data.

The first image discrimination system 40A generates the first image-discriminating output signal corresponding to the group of character image, photographic image, and the group of dot-line image.

When a certain condition is present, there are many cases in which the character image is correctly identified as it is or the character image may be incorrectly identified to be the total images For example, as shown in FIG. 12-A, when the Chinese character 園 (pronounced as "en" or "on") is input, after being filtered out of the low-pass filter 50, this character is output from the low-pass filter 50 in the state shown in FIG. 12-B. In other words, if the character contracts itself beyond a certain extent, it is obvious that, due to the function of the low-pass filter, the character content significantly blurs.

This is prominent to Chinese characters and is apt to occur in alphabetical characters whose size is of less than ten points.

Even when the target picture element is present inside of the character, if the adjoining portions fully exceed the reference depth value by the functional effect of the low-pass filter 50, the target picture element is processed as the picture image of tonal images. As a result, for example, even the image identified to be the character image shown in FIG. 13 internally and locally contains such portions which are incorrectly identified to be the tonal images. As is clear from this phenomenon, there is a certain possibility of causing the internal local portions of a small character to be identified incorrectly as the tonal image, and as a result, the character quality may be extremely degraded.

However, actually, the dot-line image or the photographic image occupies a certain region for allowing it to be discerned as the tonal image, and thus, there is no possibility to cause the tonal image to be scattered locally. In other words, when the result of the image discrimination indicates that the tonal image locally scatters in extremely narrow regions, since the tonal image cannot actually be present in such extremely narrow regions, the system can determine that the above result is faulty.

Now, as shown in FIG. 3, the second image discriminating system 40B is provided for the image processor. The second image discriminating system 40B further discerns the tonal image present in the above-cited Chinese character to be the character images. To precisely discern the tonal image in the character image to be the character image over again, first, the second image discriminating system 40B checks the tonal-image identifying region, and then judges whether this region occupies the predetermined magnitude, or not.

To achieve this, the second image discriminating system 40B stores the image data of the target picture element covering the predetermined region, and then computes the length or the area of the closed region in the total-image identifying region. To execute this process, in principle, the system needs to store the image data in both the main and subordinative scanning direction. However, due to restrictions on the hardware, the embodiment shown below stores the image data merely in the main scanning direction.

As a result, it is sufficient for the system to use such a memory having a capacity to store 1-bit data designating information to discern between character image, tonal image, and 1 line of either of these data. The test done by the inventors proved that the corrective effect was fully generated merely by performing the main scanning.

Figure 14:
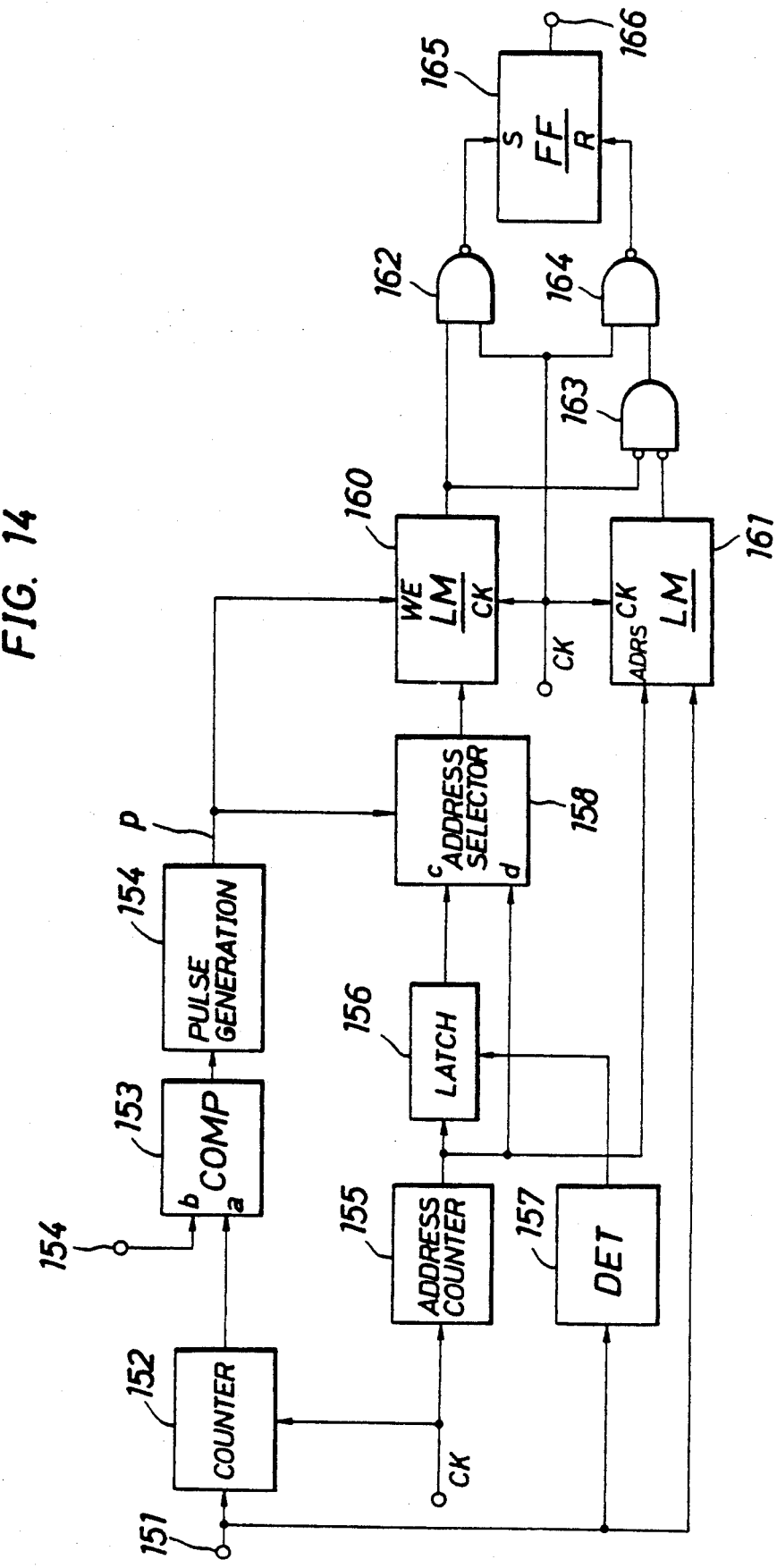
FIG. 14 is a simplified block diagram of an embodiment of the second image-discriminating circuit.

FIG. 14 is an embodiment of the second image discriminating system 40B implementing the above process.

The first image discriminating signal output from the first image discriminating system 40A is delivered to terminal 151. As mentioned earlier, the first image discriminating signal turns into "1" when dealing with the tonal image and it turns into "0" when dealing with the character image.

The first image discriminating signal activates operation of counter 152 to count the length of the tonal image. As a result, the counter 152 starts a counting operation when the binary code "1" is input and resets the counted number when the binary code "0" is input. The counter 152 counts up pulses synchronous with the dot clock CK. The counted pulse "a" output from the counter 152 is transmitted to comparator 153, which then compares the counted pulse "a" to the reference value "b" related to the reference length L shown in FIG. 15-A. The reference length L is supposed to be about 2 millimeters.

The signal output from the comparator 153 in excess of the reference value "b" turns into "1". Simultaneously, pulse generating means 154 outputs a signal control pulse "p" shown in FIG. 15-B.

The dot clock pulse CK is also transmitted to address counter 155 to generate addresses in the horizontal direction. The address data is then latched by latch circuit 156. The latch pulse is generated based on the rising edge of the first image discriminating signal. The reference numeral 157 designates the rising-edge detection circuit.

Using the control signal "p", address selector 158 selects either the address data output from the address counter 155 or the rising-edge address data latched by the latch circuit 156. In this embodiment, the address selector 158 selects the latched address data when it receives the control signal "p". The latched address data selected by the address selector 158 is delivered to the first line memory 160.

The first line memory 160 receives the control pulse "p" which functions as the write-enable pulse. As a result, when the control signal "p" is input, the predetermined level data "1" is written into the address which is latched synchronous with the rising point "o" of the first image discriminating output signal. Then, synchronous with the dot clock pulse CK, the first image discriminating output signal is written into the address of the second line memory 161 delivered from the address counter 155 as shown in FIG. 15-C.

FIG. 16 designates the process needed for reading data from the line memories 160 and 161. Concretely, those data from the line memories 160 and 161 are simultaneously read at the positions shown in the following vertical line of FIGS. 16A through C.

A data signal from the line memory 160 is delivered to the set-terminal S of RS-type flip flop 165 via NAND circuit 162. In the same way, data signals from the line memories 160 and 161 are delivered to the input-deniable AND circuit 163, and then the data signal output from the input-deniable AND circuit 163 is delivered to the reset terminal R of flip flop 165 via NAND circuit 164.

As a result, the second image discriminating signal shown in FIG. 16-D is delivered to the output terminal 166.

When operating the second image discriminating system 40B mentioned earlier, even when the first image discriminating output signal identifies the presence of tonal image as shown in FIG. 13, only when the length in the main scanning direction exceeds the predetermined length L, the system outputs the final image-discriminating signal "1" designating the tonal image.

Accordingly, if the length in the main scanning direction were less than the predetermined length L, even if the image were determined to be the tonal image, the second image discriminating system 40B eventually confirms the identity of the character image shown in FIG. 13.

As a result, the image processor of the invention can securely discern and process the input image of the original document with extreme precision and efficiency beyond the scope of all the corresponding conventional arts.

Furthermore, since the image processor of the invention processes interim tones based on the signal filtered through the low-pass filter 50, extremely distinct images containing the least "moire" stripes can be generated. By virtue of the comparison to the background texture data, even the manually-written low-contrast character data can precisely be discerned as the character image. Since incorrect discrimination of the inner structure of the Chinese character for example is fully eliminated, the image processor of the invention correctly discerns and processes all the input image data.

The image processor shown in FIG. 3 precisely discerns the character image from the tonal image merely by evaluating the length of the tonal images. It is also possible for the embodiment to additionally provide a correction circuit to discern the extremely short character image to be the incorrectly-discerned image so that the result of the discrimination can further approximate reality.

The above embodiment classifies the input image into two categories including the character image and the tonal images. However, according to this classification, the photographic image and the dot-line image are identically classified into the category of the tonal images.

On the other hand, depending on the characteristic of image output device, it is desired that the photographic image and the dot-line image be output by applying specific processes different from each other.

For example, in order to minimize the "moire" stripe mentioned earlier, when dealing with a dot-line image, it is better for the image processor to apply the interim line processing operation like the dither method to the digital image signal filtered through the low-pass filter 50. On the other hand, since the photographic image is free from occurrence of the "moire" stripe, in some cases, in order to prevent a decrease of the high-frequency component, in other words, in order to prevent degradation of the resolution, it is better for the image processor to apply the interim-tone process to the photographic image fresh from the original document without filtering through the low-pass filter 50.

Figure 17:
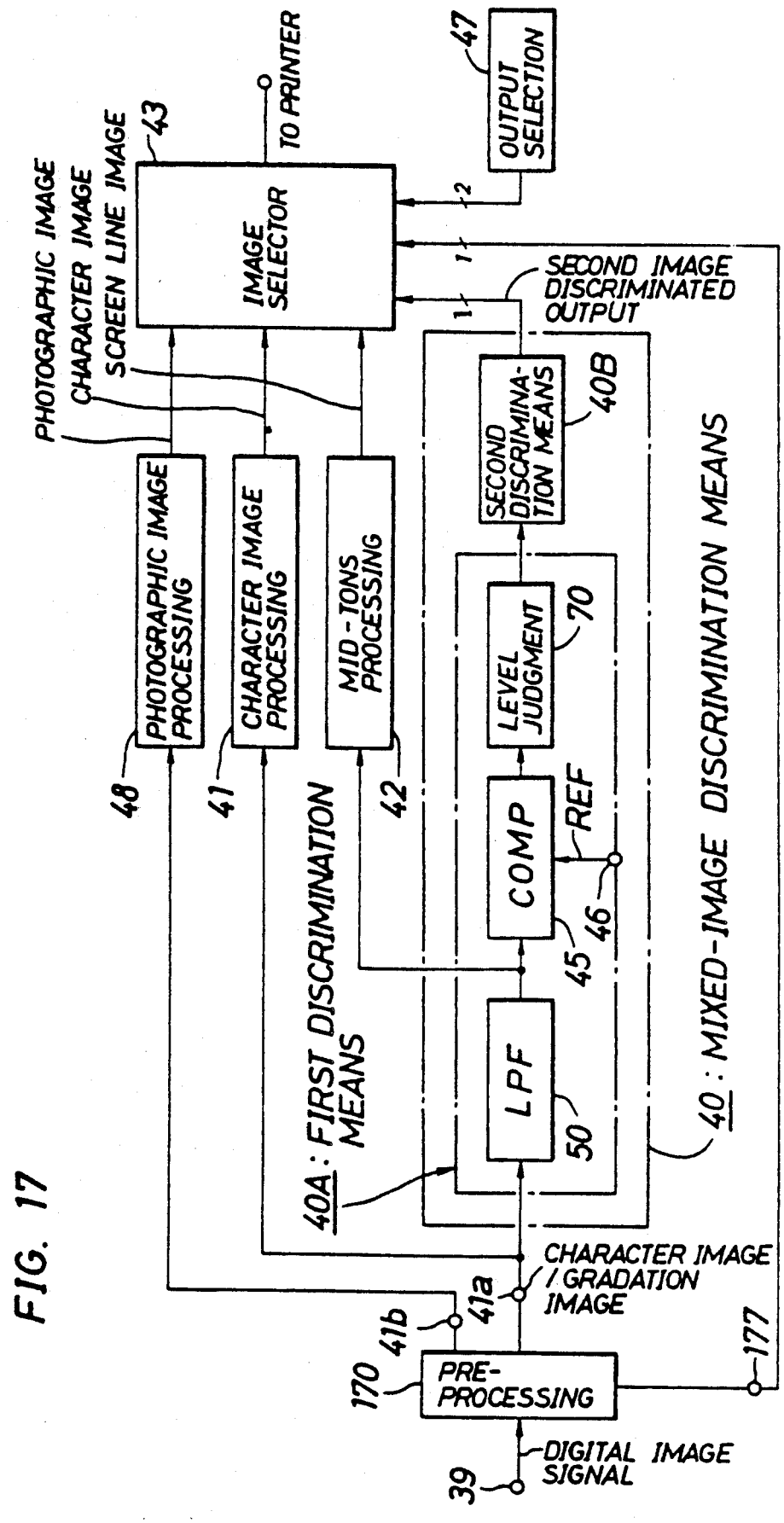
FIG. 17 is a schematic block diagram of another embodiment of the image processor related to the invention.

Another embodiment of the image processor shown in FIG. 17 is proposed to satisfy those requirements mentioned above. Those reference numerals identical to those shown in FIG. 3 respectively designate identical components.

The embodiment shown in FIG. 17 provides the pretreatment circuit 170. Based on the image data of the input digital image signal complete with the MTF correction delivered to terminal 39, the pre-treatment circuit 170 discerns whether the input digital image is actually the photographic image or not, and then separates the photographic image from others.

Concretely, the pre-treatment circuit 170 discerns whether the input digital image is actually the photographic image or not according to the difference of depth between the target picture element and the adjoining picture elements.

After arrival at terminal 41b, the digital image signal related to the photographic image is then transmitted to the photographic-image processing circuit 48 which functions as multi-digital-value-coding means, which then applies a specific multi-digital-value-coding process to the digital photographic image without lowering resolution at all.

Likewise, the digital image signal (excluding the photographic image) delivered to terminal 41a is routed to the character-image processing circuit 41, which then applies a specific multi-digital-value-coding process to the input digital image signal so that a character can be reproduced very distinctly. Since binary-coding is sufficient for the character image, the digital image signal is converted into a binary code by applying the stationary threshold value. Further steps for processing the digital image signal are identical to those of the first embodiment shown in FIG. 3, and thus, description of these is deleted.

Generally, unlike the character image and the dot-line image, the depth of adjoining picture elements of the photographic image mildly varies. Conversely, in the case of the character image and the dot-line image, there is substantial difference of the depth between character or dot and the background texture, and yet, the depth of adjoining picture element along the counter against the background texture is significantly variable.

If the difference of depth between the target picture element and adjoining picture elements were less than the predetermined value, using this difference as the parameter, the image processor of the invention can determine this as the photographic images In this case, the depth of the background texture portion slightly varies. Considering that the absolute depth of the background texture portion is constantly weaker than the predetermined level (this value is very low), it is necessary for the system to exclude it from the photographic image region.

Figure 18:
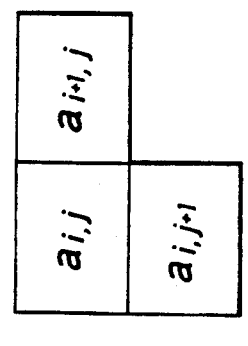
FIG. 18 is a chart designating the image-discriminating process.

To implement those processes mentioned above, in addition to the depth ai, j of the target picture element shown in FIG. 18, the depth ai+1, j of the picture element shown to the right of the main scanning direction and another depth ai j+1 of the picture element right below the depth ai, j in the subordinative scanning direction are respectively used. The relationship between these picture elements is expressed in the following equations.

$$S1 = ai, j - ai+1, j$$

$$S2 = ai, j - ai+j+1$$

where S1 and S2 respectively designate the difference of depth.

The above equations designate that the greater the values of these (i.e., the absolute values), the clearer the contrast against the background. As a result, if at least either the difference of depth S1 or S2 is less than the predetermined threshold value, or if both of these were less than the predetermined threshold value, then, the pretreatment circuit 170 executes the process for identifying the target picture element to be the photographic image throughout the entire picture elements.

Figure 19:
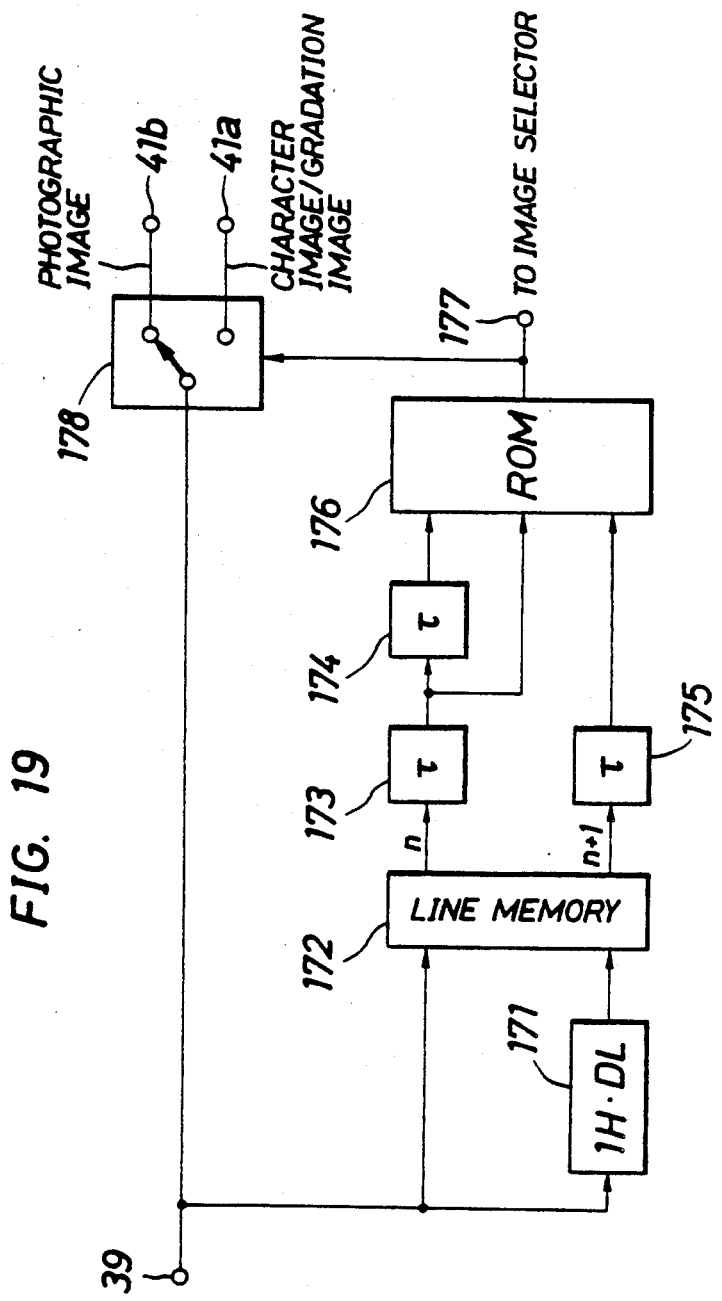
FIG. 19 is a detailed block diagram of the preliminary image processing circuit shown in FIG. 17.

FIG. 19 is the schematic block diagram of an embodiment of the pre-treatment circuit 170.

The input digital image signal delivered to input terminal 39 and the other input digital image signal delayed by 1H horizontal scanning period by the delay circuit 171 are respectively stored in the line memory 172. These digital image signals are then delivered to latch circuits 173 through 175, which respectively delay the input digital image signals by a period corresponding to two picture elements and one picture element before transmitting these delayed image signals to the depth-level judging circuit 176 (ROM). By referring to the content of the digital image signals output from the latch circuits 173 through 175, the depth-level judging circuit 176 judges the level of the depth of the images. Actually, due to the relationship between signals output from these latch circuits, the scope of the depth level against the threshold value can easily be detected, and thus, a lookup-table-stored ROM is used for the depth-level judging circuit 176.

One-bit data designating the result of discrimination whether being the photographic image or not is delivered to the output terminal 177. Only when the discerned result is delivered to the output terminal 177, switching means 178 is operated as shown in FIG. 19 so that the input digital image signal at the input terminal 39 can be transmitted to the photographic image processing circuit 48 (not shown). This signal is also delivered to the image selector 43 (not shown), where this signal is used for selecting the multi-digital-value-coded output signal by functioning as the image-discriminating output signal.

By implementing those processes mentioned above, the photographic image can be separated from other images before being filtered. This permits the system to execute those processes suited for each images. For example, the system can execute such a process for improving the resolution of the photographic image alone.

Even if the system discerns the input image to be the photographic image merely by checking extremely narrow regions, since it cannot be present actually, the system can perform a corrective process by further discerning that the initially discerned image is not the photographic image, and as a result, the system can improve the capability for correctly discerning and image.

Even if the values of the depthwise differences S1 and S2 were negligible, it is necessary for the system to separate the extremely weak (white) picture element from the photographic image by discerning that this picture element is possibly the background texture itself (the original texture itself) so that this can be classified into images falling under other groups.

The system can independently set the threshold values against the depthwise differences S1 and S2. By independently setting threshold values, even if there were differences in the resolution of the image and also in the image constrast, the system can use the correct threshold value.

The image processor of the invention compares the absolute values of the depthwise differences S1 and S2 to the threshold value. Furthermore, the depthwise difference can be judged in the presence of polarity. This cannot be achieved merely by checking to see if the depthwise differences S1 and S2 are in the predetermined range.

As is clear from the foregoing detailed description, even when input signals intermingled with character image having strong and weak depth, photographic image, and dot-line image are input, the image processor of the invention securely discriminates each of these images. In particular, even when dealing with such an original document containing a tonal image a like-dot-line image, the occurrence of a "moire" stripe is securely minimized, thus significantly improving the image quality.

Furthermore, the image processor of the invention executes discrimination of the image-discriminating signal of tonal image present in the first image-discriminating output signal corresponding to character image over again before eventually correcting the result of discrimination by applying the discriminating output signal (which incorrectly identifies the character image as the tonal image) as the character-image discriminating output signal.

By virtue of the function mentioned above, even when dealing with an extremely small character image, the image processor can securely identify it as the character image, thus drastically improving the quality of the copied image.

Furthermore, since the invention allows the common use of the identical signal low-pass filter of image-discriminating means in conjunction with the multi-digital-value-coding means for improving image quality, the construction of the image processing circuit is greatly simplified.

Furthermore, even if the identical tonal image were input, the image processor of the invention securely discerns a dot-line image from a photographic image so that an image signal corresponding to the photographic image can be separated in advance. By virtue of this function, since the image processor can execute a multi-digital-value coding process solely for the photographic image, the image processor can securely reproduce a high-resolution photographic image.

As a result, the image processor of the invention is ideally suited for application to such an image processing apparatus like an electrophotographic digital copying apparatus for example.

What is claimed is:

1. An image processor comprising:
   discrimination means for discriminating image signals and for generating per pixel one of a character signal representing a character image and a tonal signal representing a tonal image, said tonal signal being successively generated in accordance with a length of said tonal image, whereby a series of tonal signals are generated;
   measuring means for measuring said length of said tonal image by counting a number of signals in said series of tonal signals.
   comparison means for comparing said number of signals with a first reference value; and
   converting means for converting said series of tonal signals to a series of character signals when said number of signals is smaller than said first reference value.

2. The image processor as set forth in claim 1, wherein said discrimination means comprises:
   diminishing means for diminishing a high-frequency component of said image signals;
   first classification means for comparing density data of an output signal from said diminishing means with a second reference value and for generating a binary signal pixel by pixel successively, whereby a series of binary signals including a binary signal for a target pixel is generated; and
   second classification means for generating either said character signal or said tonal signal for said target pixel with reference to said binary signal for a target pixel and binary signals for pixels in a region adjoining said target pixel.

3. The image processor as set forth in claim 2, wherein said second classification means comprises means for processing said binary signal and for generating said tonal signal only when all of said binary signals corresponding to said target pixel and said pixels in said region are at a high level.

4. The image processor as set forth in claim 3, wherein said second classification means has a crossed window sensing pattern extending in main and subordinative scanning directions from said target pixel by an identical number of pixels.

5. The image processor as set forth in claim 4, wherein the size of said crossed window sensing pattern is seven pixels times seven picture elements.

6. The image processor as set forth in claim 2, wherein said diminishing means comprises a low-pass filter which is substantially a crossed convolutional filter having an identical number of pixels extending from a target pixel in main and subordinative scanning directions.

7. The image processor as set forth in claim 6, wherein said convolutional filter causes the density value obtained from a division of a sum of the density values of image signals corresponding to all pixels inside of said convolutional filter by the number of pixels inside of said convolutional filter to turn into the density value of said target pixel.

8. The image processor as set forth in claim 6, wherein the size of said convolutional filter is three pixels times three pixels.

9. The image processor as set forth in claim 2, further comprising detection means for detecting a target pixel as an isolated image in a case in which all pixels surrounding said target pixel except for said target pixel are below a predetermined density value after the receipt of output signals from said diminishing means.

10. The image processor as set forth in claim 1, wherein said measuring means comprises a counter which is set by said tonal signal, said counter counting up synchronous with a clock signal and being reset by said character signal.

11. The image processor as set forth in claim 2, further comprising third classification means for classifying each of said image signals into a photographic image and others before the high-frequency component of said image signals is diminished by said diminishing means.

12. The image processor as set forth in claim 11, wherein said third classification means classifies each of said image signals per pixel and discerns that each of said image signals corresponding to a target pixel is substantially a photographic image responsive to a density depthwise difference between said target pixel and adjoining pixels being below a predetermined threshold value.

13. An image processor comprising:
processing means having first multi-value coding means and second multi-value coding means for coding density data of image signals to multi-values;
diminishing means for diminishing a high-frequency component of said image signals;
first classification means for comparing density data of an output signal from said diminishing means with a second reference value and for generating a binary signal pixel by pixel successively, whereby a series of binary signals including a binary signal for a target pixel is generated;
second classification means for generating one of a character signal representing a character image and a tonal signal representing a tonal image for said target pixel with reference to said binary signal for a target pixel and binary signals for pixels in a region adjoining said target pixel, said tonal signal being successively generated in accordance with a length of said tonal image, whereby a series of tonal signals are generated;
measuring means for measuring said length of said tonal image by counting a number of signals in said series of tonal signals;
comparison means for comparing said number of signals with a first reference value;
converting means for converting said series of tonal signals to character signals when said counted number of signals is smaller than said first reference value; and
selection means for, based on an output signal from said converting means, selecting either said first multi-value coding means or second multi-value coding means.

14. The image processor as set forth in claim 13, wherein said output signal from said diminishing means is also input to said processing means so that said output signal from said diminishing means is also input to said processing means so that said output signal from said diminishing means can be used for an image signal of the tonal image.

15. The image processor as set forth in claim 13, further comprising third classification means for classifying each of image signals into a photographic image and others before high-frequency components of said image signals are diminished by said diminishing means, and wherein, based on a signal output front said third classification means, a classified image signal of a photographic image is extracted and delivered to said processing means, and wherein the content of said multi-value coding process is selected based on signals output from said converting means and said third classification means.

16. The image processor as set forth in claim 15, wherein said output signal from said diminishing means is also delivered to said processing means so that said output signal from said diminishing means can be used for an image signal of a dot-line image.

17. The image processor as set forth in claim 13, wherein one of said first and second multi-value coding means includes means for binarizing said density data.

* * * * *